United States Patent Office 3,017,004
Patented Jan. 16, 1962

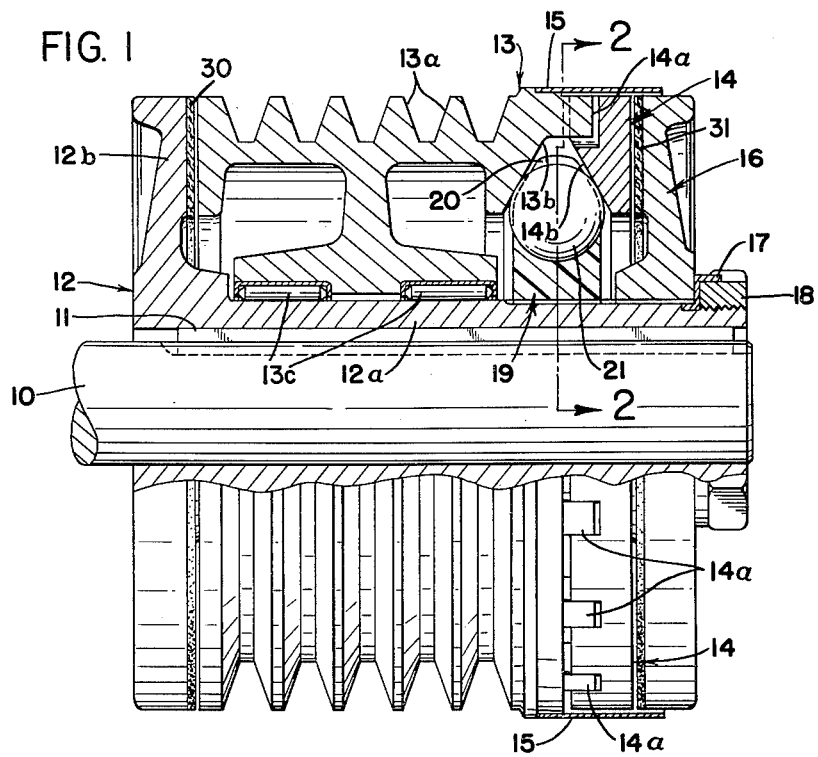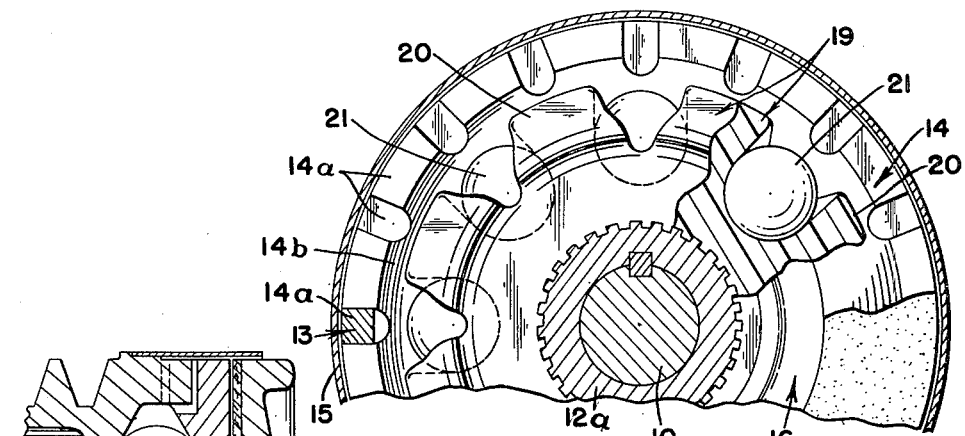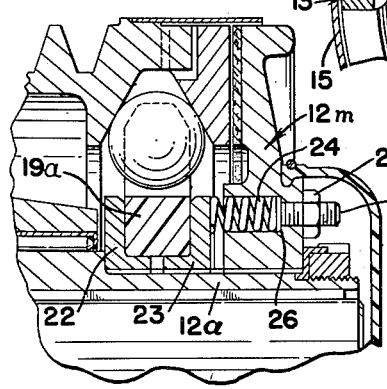

3,017,004
CENTRIFUGAL CLUTCH ASSEMBLY
Thomas L. Fawick, Cleveland, Ohio, assignor to Fawick Corporation, a corporation of Michigan
Filed Dec. 30, 1958, Ser. No. 783,841
4 Claims. (Cl. 192—105)

This invention relates to centrifugal clutches of the type in which a set of circumferentially spaced balls or the like are urged outwardly by centrifugal force and thus wedge apart axially a pair of clutch elements, for clutch engagement.

Its chief objects are to provide a simple and highly compact clutch structure; to provide a clutch in which the driven clutch structure can be within the confines of the driving structure; to provide a clutch having two planes of frictional engagement well spaced apart axially for shared transmission of the torque at the two wide-span positions; to have annular zones of frictional engagement at each side of the centrifugal mechanism, axially of the assembly, so that wear of the frictional engagement surfaces will not result in excessive axial shifting of the positions of the elements of the centrifugal mechanism; to provide a clutch having the centrifugal mechanism well enclosed by clutch elements free of dangerous projections or crevices; to provide in an improved manner for circumferential distribution of the wear of the surfaces with which the centrifugal members contact in their wedging action; to provide a clutch having relatively light driving elements, for low inertia load; and, with regard to the last mentioned object and with regard to other features of the assembly, to provide a clutch especially well adapted for mounting on the motor shaft of a constant speed electric motor.

Of the accompanying drawings:

FIG. 1 is an axial section of an assembly embodying my invention in its preferred form for a small or light duty clutch.

FIG. 2 is a section on line 2—2 of FIG. 1.

FIG. 3 is a fragmentary axial section of a modification.

Secured upon the driving shaft 10, with a key 11, is a driving member 12 having a sleeve hub portion 12a and a clutch-disc portion 12b. Journaled on the hub portion 12a for frictional coaction with the clutch-disc portion 12b is a driven clutch member 13, here shown as being of the same maximum diameter as the driving member 12 and formed in its outer face with V-belt grooves 13a, 13a. The driven clutch member 13 carries roller bearings 13c which engage the hub 12a rotatably and also slidably, thereby enabling the driven clutch member to be moved axially along hub 12a.

Axially slidable with relation to the driven member 13 but interlocked with it by interfitting jaws at 14a against relative circumferential movement is a clutch ring 14 which is held centered by a thin cylindrical ring 15 press-fitted or otherwise mounted at one of its ends upon the adjacent end of the driven belt-pulley member 13. The clutch ring 14 is adapted for frictional coaction with a driving clutch-disc 16 which is splined upon the sleeve hub 12a and retained thereon by a lock-washer 17 and a nut 18.

The driving members 12 and 16 and the respective driven members are provided with means on certain of said members for clutching engagement between the axially inward ends of both driving members 12 and 16 and the axially outward ends of the respective driven members 13 and 14. As shown in FIGURE 1, such clutching engagement means are constituted by an annular disk 30 of friction material on the axially inward end of driving member 12 and a similar friction disk 31 on the axially inward end of driving member 16.

The hub portions of the driven member 13 and the driving disc 16 are at a distance from each other axially of the assembly and between them a ball-impelling ring 19, preferably of a self-lubricating or inherently slippery material such as nylon, is slip-splined upon the sleeve-hub element 12a.

The outer periphery of the ball-impelling ring 19 is of outwardly narrowing form and is formed with a set of evenly spaced ball sockets defined by intervening ball-impelling fingers 20, 20 for compelling respective balls 21, 21 to rotate with the ring 19 and thus develop centrifugal force for coacting with conical annular surfaces 13b, 14b on the members 13 and 14 respectively for forcing those members apart axially and thus effecting the clutch engagement.

Preferably the floor of each ball socket is spherical and complementary to the surface of the ball, for centering the ring 19 in relation to the balls in the return movement of the balls toward the axis of rotation, and preferably the ring, along the sockets, is of less axial thickness than the ball diameter, so that as the balls are moved outward from their seats by the centrifugal force they can immediately equalize their pressures against the sloping faces 13b, 14b.

Return springs are not shown because in the case of a centrifugal clutch mounted upon the shaft of a constant speed electric motor the operation of the driven machine usually is stopped by turning off the motor and thus there is no need for otherwise terminating the effectiveness of the centrifugal force.

The faces 13b, 14b of course converge outwardly at a large enough angle to avoid the presence of an "angle of repose" that would cause the balls to stay strongly wedged between those surfaces after the turning off of the motor.

In the structure described, the cam surfaces 13b and 14b both being on driven elements and having the same cone angle, and being compelled by the jaws at 14a to rotate at the same speed, the balls can have free and equal rolling contact with the faces 13b and 14b while engagement of the clutch is bringing the driven elements up to full speed.

Slip contacts of the balls with the nylon ring do not result in substantial wear or loss of power, because of the slippery character of the nylon and because only a small amount of force is at any time exerted between the nylon ring and the balls. Also, because of the always even speed of the faces 13b, 14b of the two driven elements, there is very little or practically no slip contact between the balls and the nylon ring, such as would cause wear or power loss, because substantially the only pressure of the free-rolling balls against the ring is their inertia pressure during their acceleration.

The modification shown in FIG. 3 embodied features that are claimed in my copending application Ser. No. 782,480, filed December 23, 1958. In this modification the nylon cam-impelling ring, 19a, is loose-journaled on and between a pair of cross-sectionally L-shaped friction-drive rings 22, 23 which are splined on the adjacent driving sleeve hub 12a and of which the ring 22 is held against leftward axial movement by a stop-shoulder on said hub. A set of compression springs, such as the spring 24, are interposed between the ring 23 and the clutch-disc element, 12m, which is formed with suitable spring-seat sockets as shown. For varying the friction-drive pressure of the springs against the friction-drive ring 23, respective adjusting screws, such as the screw 25, are threaded through the end walls of the respective spring-seat sockets, bear against respective spring seat discs, 26, slidably mounted in the sockets, and on the outer side of the element 12m are provided with respective holding nuts, 27.

In this embodiment the ring 19a is driven frictionally by the rings 22, 23, and adjustment of the friction-drive pressure is provided, for varying the quickness of clutch engagement, by the adjusting screws.

The invention has the advantages that are set forth in the above statement of objects and other modifications are possible without sacrifice of all of those advantages and with departure from the scope of the invention as defined in the appended claims.

I claim:

1. In a centrifugal clutch assembly, the combination of a rotary input drive element, a pair of axially spaced rotary driving members coupled to said input drive element to be driven thereby, a pair of rotatable driven members mounted between said driving members, at least one of said driven members having a substantial axial thickness so that said driven members space said driving members apart a substantial distance axially, said driven members being coupled to each other to rotate in unison and being movable axially with respect to one another, means on certain of said members for clutching engagement between the axially inward ends of both driving members and the axially outward ends of the respective driven members when the driven members are moved axially apart from one another and toward the respective driving members, said driven members at their axially inward ends presenting axially spaced apart, confronting annular cam faces which converge toward each other in a radially outward direction and which define between them an annular cam space which is progressively narrower radially outward, a rotatable cam carrier, and a plurality of circumferentially spaced cams carried by said cam carrier in said cam space for engagement with said cam faces, said cam carrier being coupled to said input drive element to be rotated thereby independent of the engagement of said cams with said driven members, said cams being mounted on said cam carrier to turn therewith in said cam space and to move outward centrifugally in response to the rotation of the cam carrier to force said driven members axially apart from each other and into clutching engagement with said driving members.

2. The clutch assembly of claim 1 wherein said cam carrier is coupled directly to said input drive element to rotate therewith.

3. The clutch assembly of claim 1 wherein there is provided friction clutch means coupling said cam carrier to said input drive element.

4. The clutch assembly of claim 1 wherein said one driven member which has a substantial axial thickness is exposed at its periphery and constitutes a pulley for driving a belt.

References Cited in the file of this patent
UNITED STATES PATENTS

| | | |
|---|---|---|
| 1,092,015 | Bryant | Mar. 31, 1914 |
| 1,618,644 | Dickson | Feb. 22, 1927 |
| 1,766,227 | Russell | June 24, 1930 |
| 1,801,590 | Dickson | Apr. 21, 1931 |
| 1,889,291 | Pirinoli | Nov. 29, 1932 |
| 1,994,588 | Nakashian | Mar. 19, 1935 |
| 2,180,217 | Thomas | Nov. 14, 1939 |
| 2,753,967 | Bowers | July 10, 1956 |

FOREIGN PATENTS

| | | |
|---|---|---|
| 283,380 | Great Britain | Jan. 12, 1928 |
| 1,024,294 | Germany | Feb. 13, 1958 |